Figure 1:
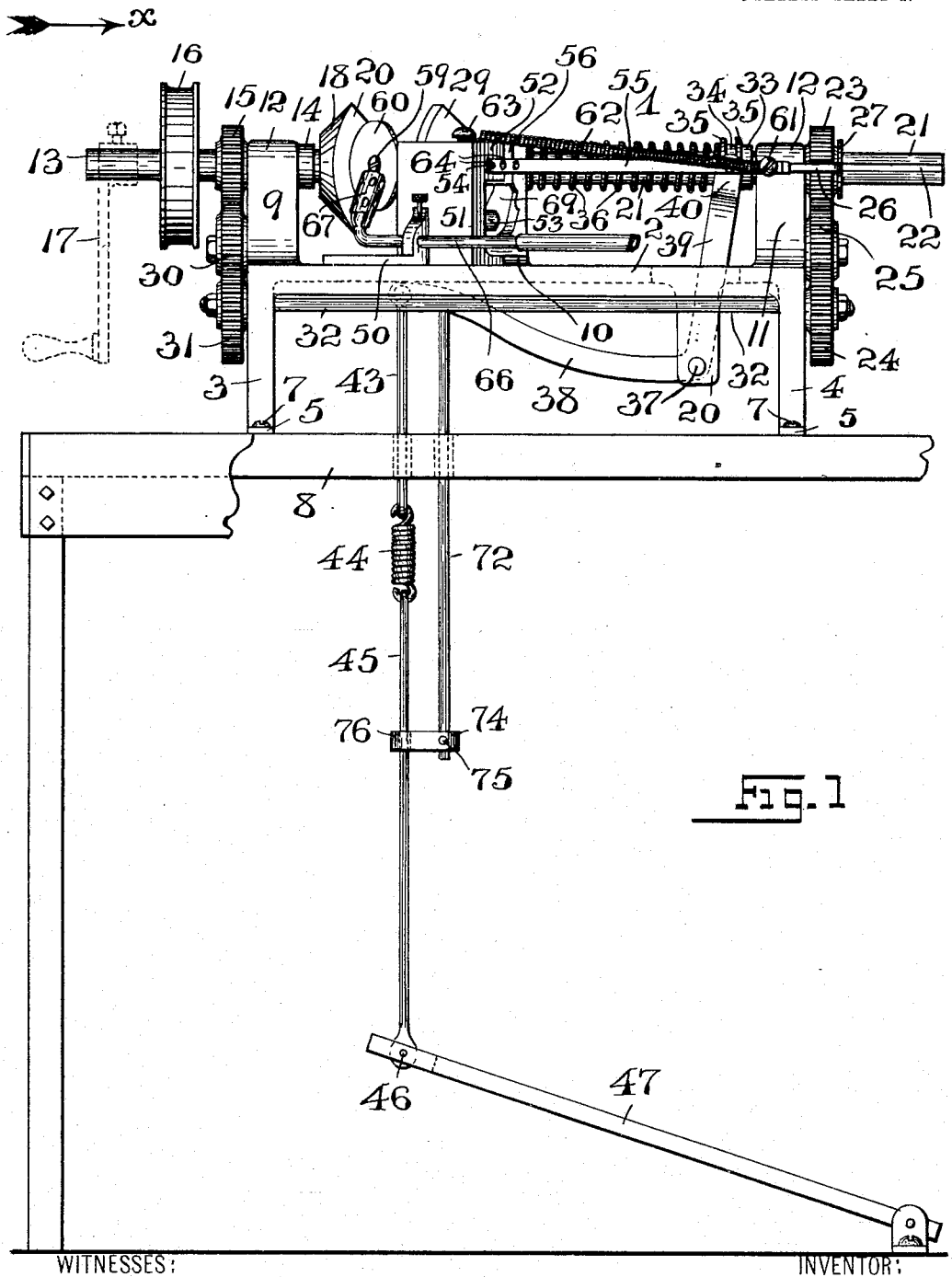

C. J. LYSAGHT.
MACHINE OR APPARATUS FOR CREASING THE EDGES OF CORNER PIECES.
APPLICATION FILED DEC. 21, 1908.

939,145.

Patented Nov. 2, 1909.

5 SHEETS—SHEET 1.

WITNESSES:

INVENTOR:
Cornelius J. Lysaght,
BY Fraentzel and Richards,
ATTORNEYS.

C. J. LYSAGHT.
MACHINE OR APPARATUS FOR CREASING THE EDGES OF CORNER PIECES.
APPLICATION FILED DEC. 21, 1908.

939,145.

Patented Nov. 2, 1909.

5 SHEETS—SHEET 2.

WITNESSES:
Fredk H. W. Fraentzel
Anna H. Alter

INVENTOR:
Cornelius J. Lysaght,
BY
Fraentzel and Richards,
ATTORNEYS

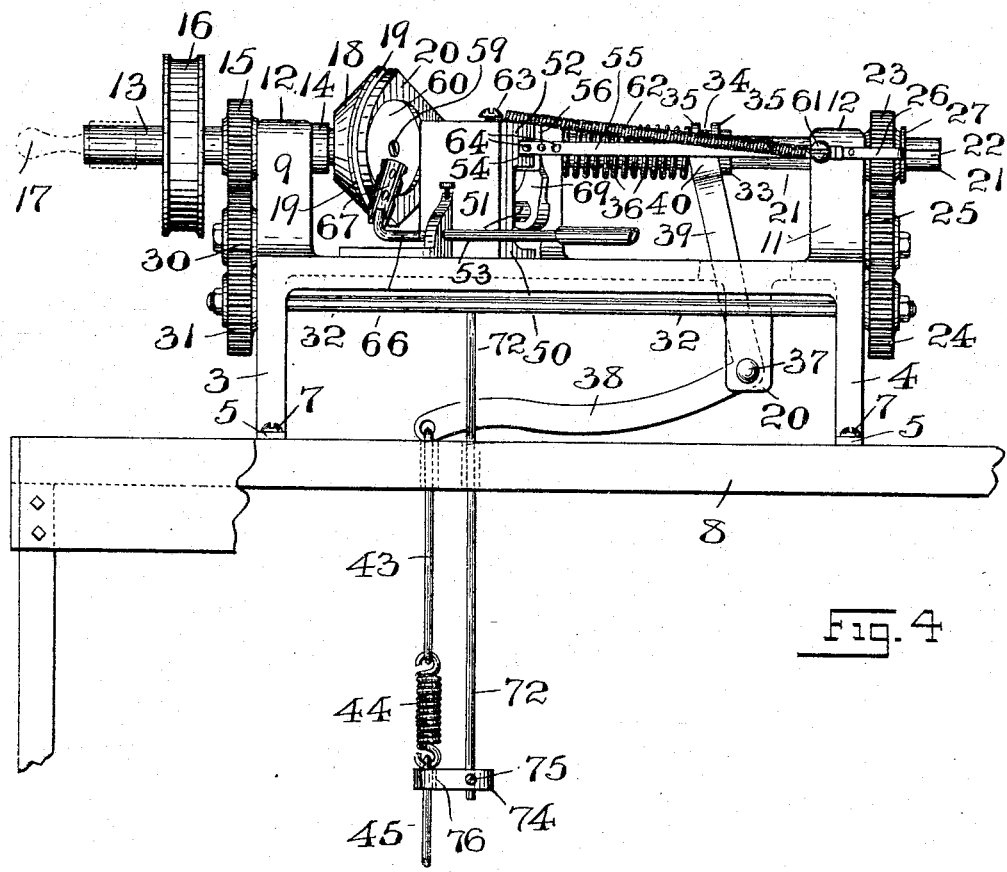
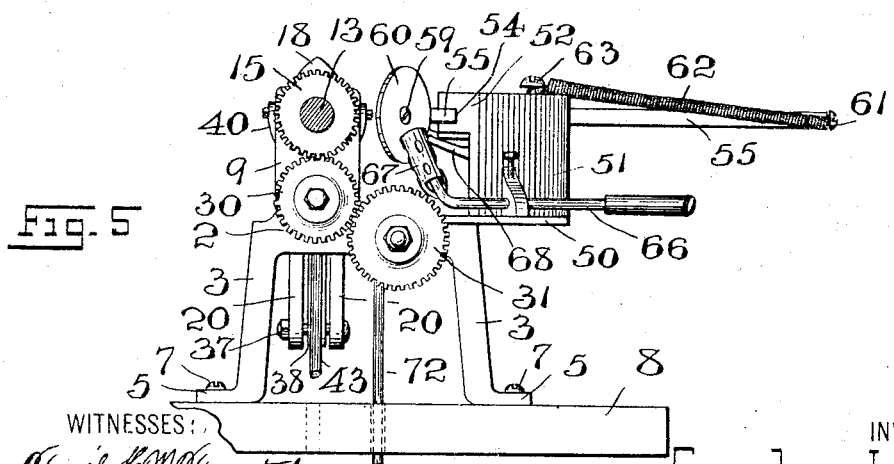

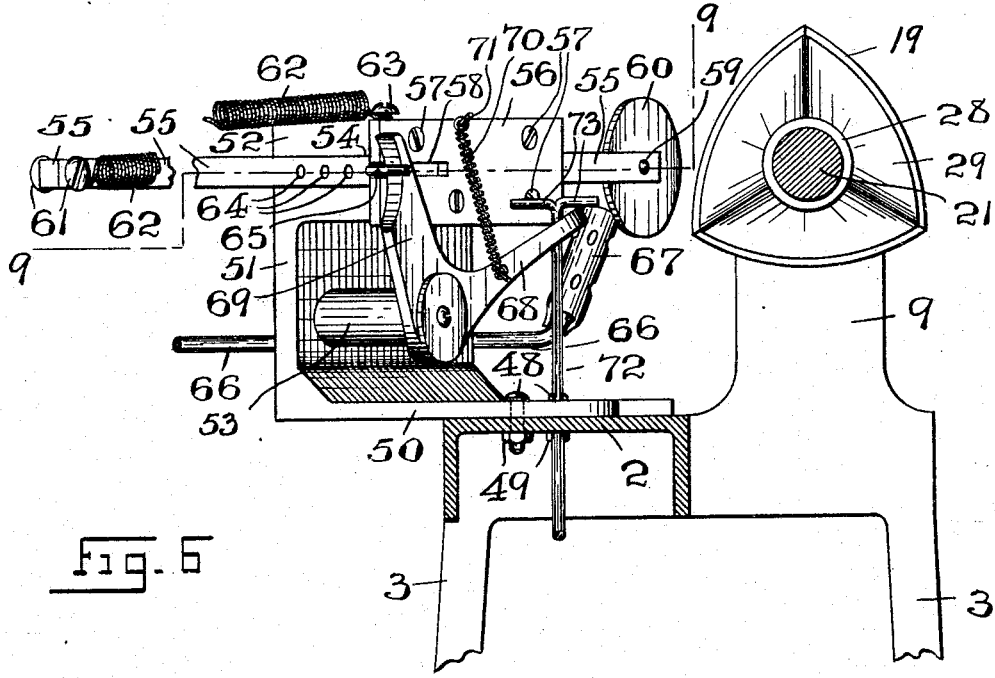
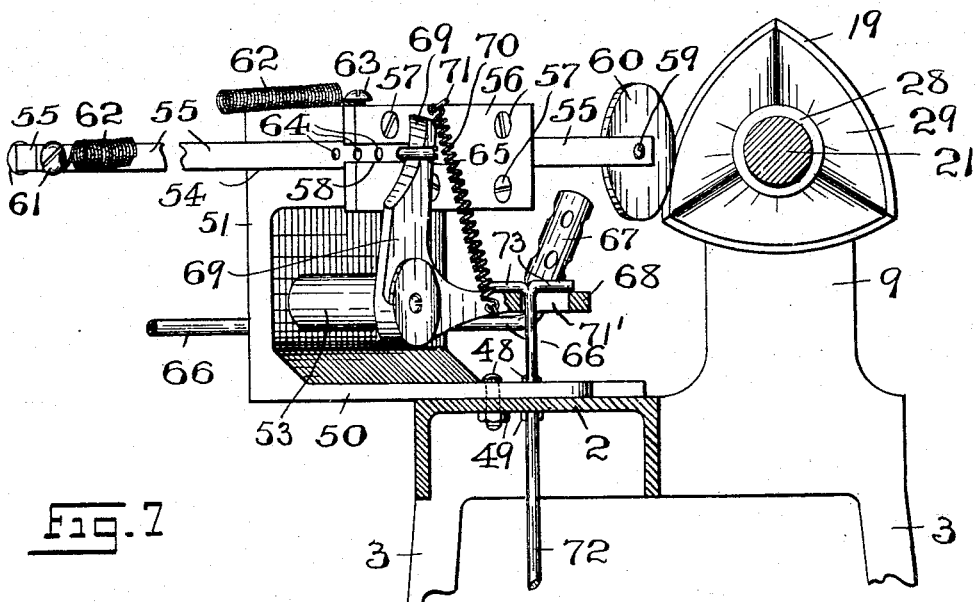

C. J. LYSAGHT.
MACHINE OR APPARATUS FOR CREASING THE EDGES OF CORNER PIECES.
APPLICATION FILED DEC. 21, 1908.

939,145.

Patented Nov. 2, 1909.
5 SHEETS—SHEET 5.

WITNESSES:
Fredk. H. W. Fraentzel
Anna H. Aeter

INVENTOR:
Cornelius J. Lysaght,
BY Fraentzel and Richards,
ATTORNEYS.

UNITED STATES PATENT OFFICE.

CORNELIUS J. LYSAGHT, OF NEWARK, NEW JERSEY, ASSIGNOR TO THE R. NEUMANN HARDWARE CO., A CORPORATION OF NEW JERSEY.

MACHINE OR APPARATUS FOR CREASING THE EDGES OF CORNER-PIECES.

939,145.  Specification of Letters Patent.  Patented Nov. 2, 1909.

Application filed December 21, 1908. Serial No. 468,631.

*To all whom it may concern:*

Be it known that I, CORNELIUS J. LYSAGHT, a citizen of the United States, residing at Newark, in the county of Essex and State of New Jersey, have invented certain new and useful Improvements in Machines or Apparatus for Creasing the Edges of Corner-Pieces; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in creasing machines; and, the invention has reference, more particularly, to a novel machine or apparatus which is to be employed more especially for the purposes of creasing the edge-portions of that class of corner-pieces which are made from leather, or other suitable material, and which are used upon the corners of suit-cases, bags, and the like.

My present invention has for its principal object to provide a novel, simple, and effectively operating machine or apparatus of the general character hereinafter more fully set forth, and which is to be used for creasing or ornamenting the faces of triangularly formed corner-pieces, near the marginal edges of the faces thereof, all being accomplished by a preferably spring-controlled creasing element or tool which moves forwardly against and upon the clamped and rotatably disposed corner-pieces, so as to perfectly provide each corner-piece with a neatly creased edge-portion.

Other objects of this invention not at this time more particularly mentioned will be clearly understood from the following detailed description of the present invention.

With the various objects of my present invention in view, the said invention consists, primarily, in the novel creasing machine or apparatus hereinafter set forth; and, the invention consists, furthermore, in the novel arrangements and combinations of the various devices and parts, as well as in the details of the construction of the same, all of which will be hereinafter more fully set forth and then finally embodied in the clauses of the claims which are appended to and which form an essential part of this specification.

The invention is clearly illustrated in the accompanying drawings, in which:—

Figure 2:
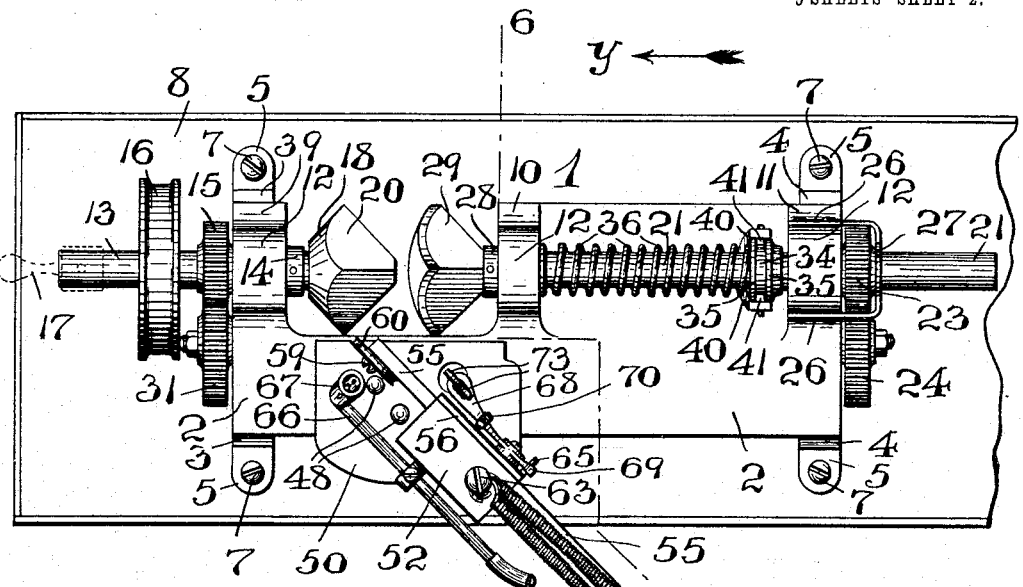
Figure 3:
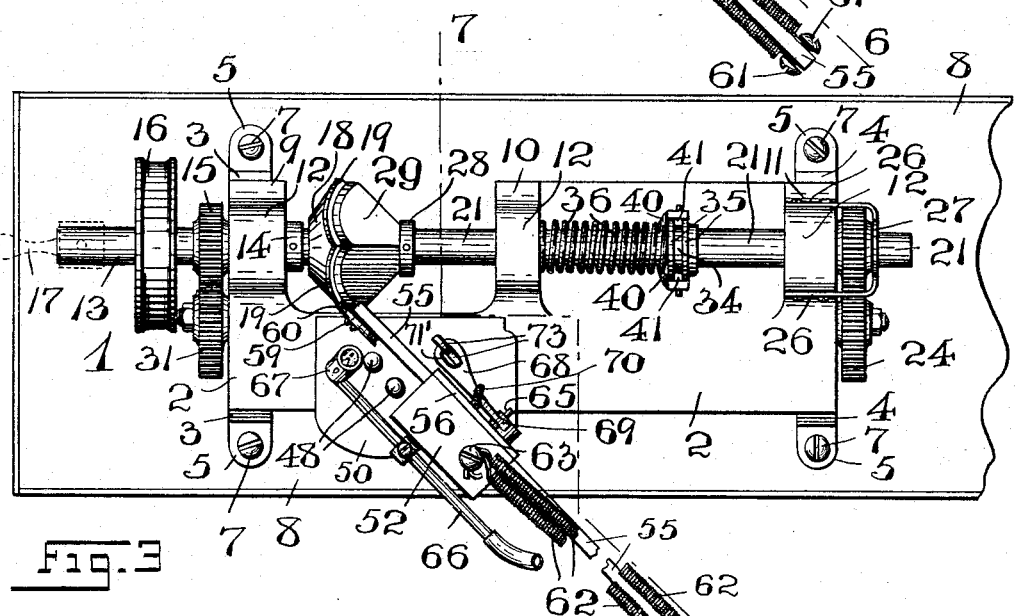
Figure 8:
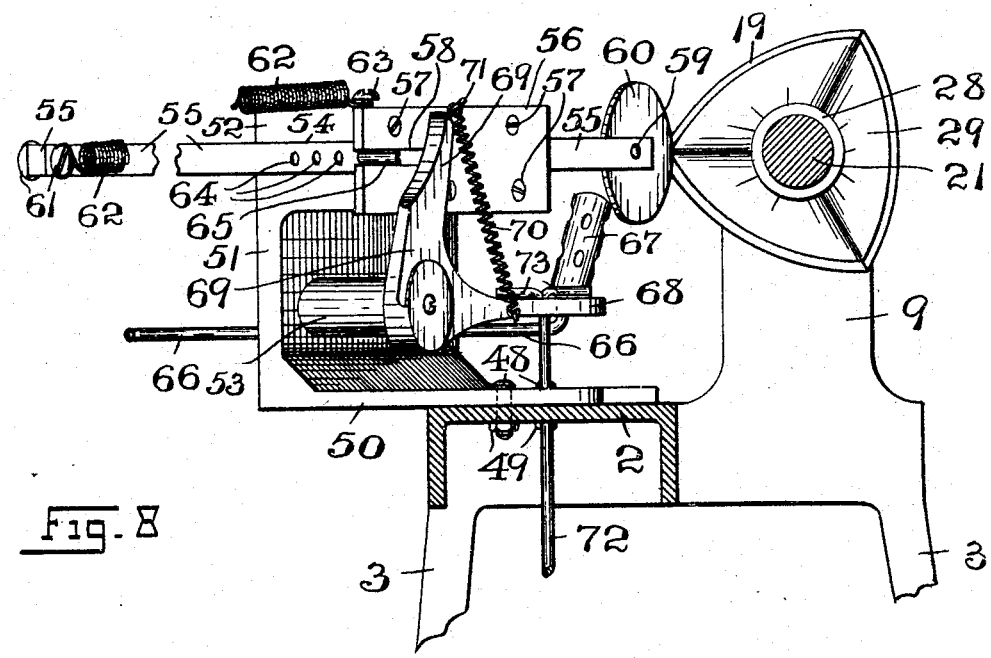
Figure 9:
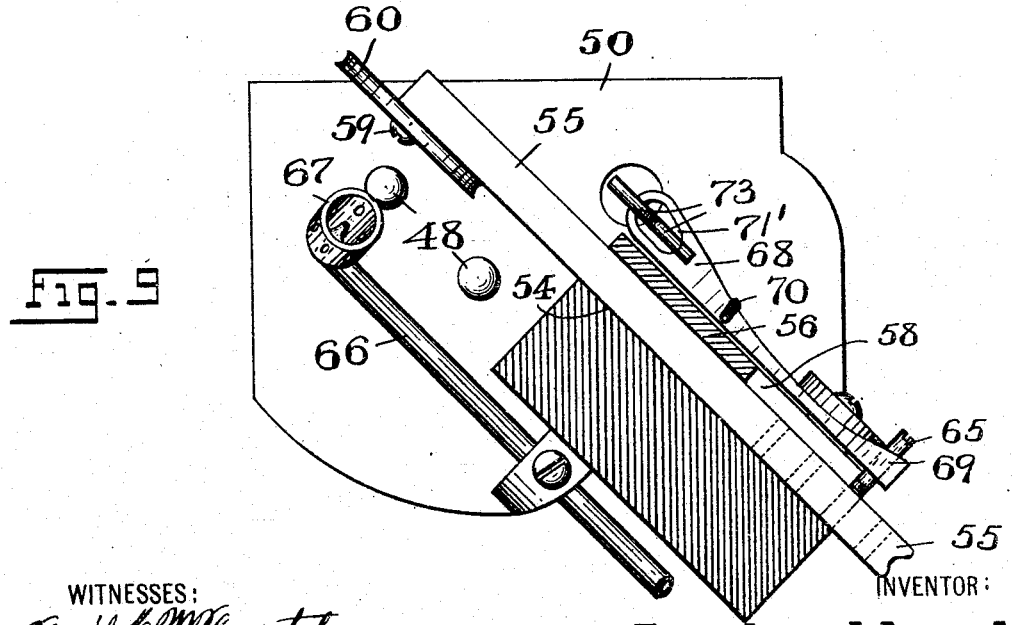

Figure 1 is a side elevation of a creasing machine showing one embodiment of the principles of the present invention, and illustrating the several parts of the machine in their normal initial positions; Fig. 2 is a top or plan view of the same; and Fig. 3 is a view similar to that represented in Fig. 2 of the drawings, illustrating the various parts of the machine in their operated positions, with the creasing tool against the clamped and rotating corner-piece for creasing the marginal edge-portions of said corner-piece. Fig. 4 is a view of the machine, similar to that shown in Fig. 1 of the drawings, but illustrating the first movement or clamping-step of the apparatus, when a triangular corner-piece is held or clamped between the male and female supporting elements of the machine, prior to the reciprocatory movements of the creasing tool; and Fig. 5 is an end view of the upper portion of the machine, looking in the direction of the arrow $x$ in Fig. 1. Fig. 6 is a transverse sectional representation of the machine, said section being taken on line 6—6 in Fig. 2 of the drawings, looking in the direction of the arrow $y$; and Fig. 7 is a similar section taken on line 7—7 in Fig. 3, looking in the same direction, said view showing the creasing tool in its operative engagement with the marginal edge-portion of the corner-piece which is securely clamped between the two holding or clamping elements of the machine. Fig. 8 is a transverse sectional representation of the machine, similar to the section represented in Fig. 7 of the drawings, said view showing a different relative engagement between the reciprocatory creasing tool and the clamped and revolving corner-piece, all of said Figs. 6, 7 and 8 being made on enlarged scales; and Fig. 9 is a detail horizontal section, with certain parts shown in elevation, said section being taken on line 9—9 in Fig. 6 and said view being made on a still larger scale.

Similar characters of reference are employed in all of the above described views, to indicate corresponding parts.

In the said drawings, the reference-character 1 indicates one complete embodiment of my present invention in the form of a creasing machine for providing the marginal edge-portions of leather or other similar corner-pieces with the usual creases. The said machine comprises a suitable base 2 formed or provided at its end-portions with suitable supports or standards 3 and 4, said standards being made with perforated ears or lugs 5 for the reception of suitable screws 7, or the like, for permanently securing the machine or apparatus in its fixed position upon the top of a suitable table or work-bench 8. The said base-plate 2 is provided with three supports or standards 9, 10 and 11, each standard being provided with a bearing-portion 12, as will be clearly seen from an inspection of the several figures of the drawings.

Mounted in the bearing-portion of the standard or support 9 is a suitable spindle or shaft 13, retained against lateral displacement from said bearing-portion by a collar 14 suitably secured upon said spindle or shaft 13, and the hub of a gear-wheel 15 also suitably secured upon said spindle or shaft. The said spindle or shaft may be operated by means of a power-driven belt arranged over a pulley 16, suitably mounted and secured upon said spindle or shaft; or, the said spindle or shaft may be manually operated by means of a crank 17, indicated in dotted outline in Figs. 1, 2, 3 and 4 of the drawings, and as will be clearly understood from an inspection of said figures.

Suitably secured upon the end-portion of the spindle or shaft 13, near the collar 14, is a master or male member 18 for the support thereon of a triangular leather corner-piece 19, the said master or member 18 being made with three angularly disposed sides or faces 20 corresponding to the interior configuration of the corner-piece, and thus providing a truncated pyramid, upon which the corner-piece can be easily fitted and made to register with the said master or male supporting member 18, as will be clearly evident. Mounted in the bearing-portions 12 of the two standards or posts 10 and 11, so as to revolve therein, but being capable also of a longitudinal sliding movement, in the manner and for the purposes hereinafter more fully specified, is a second spindle or shaft 21. One means of driving this second spindle or shaft is as follows:—The said spindle or shaft is provided with a longitudinally extending slot or groove 22, and 23 indicates a driving gear for revolving said shaft. That the said spindle or shaft 21 can slide back and forth in the bearing-portions of the standards or posts 10 and 11, the gear-wheel 23 is loosely arranged upon the shaft 21, and is provided with a key, not here shown, which projects into said slot or groove 22 in the side of the shaft, so that these parts are operatively connected and will operate in the manner set forth and shown in my former application for Letters-Patent, filed October 9th, 1908, Serial Number 456,877 for improvements in apparatus for cutting and trimming corner pieces. In order that the said gear-wheel 23 will remain in its fixed position with reference to a gear-wheel 24 and an idler 25, a yoke or strap, as 26, may be suitably secured to the sides of the support or post 11, the said yoke or strap having an enlarged and perforated portion 27 through which the shaft or spindle 21 extends. In this manner, as will be clearly evident, the gear-wheel 23 is at all times retained in its operative position, against lateral movement upon the shaft 21, by the side of the support or post 11 and the strap or yoke. Near the opposite end-portion of the said shaft or spindle 21 is a collar 28, suitably fixed thereon, so as to act as a stop and limit the return movement of said shaft or spindle 21, and suitably mounted and secured upon said free end-portion of the shaft or spindle 21 is a female corner-piece clamping member or element 29, said female clamping member being made with a hollow three-sided receiving portion, conforming to the three-sided truncated pyramidal shape of the master or male supporting member, so as to be fitted over and register with said male member, when the said shaft or spindle 21 is moved in a forward direction in the manner and for the purposes to be hereinafter more fully described.

Referring now more particularly to Fig. 5 of the drawings, it will be seen, that the previously mentioned gear-wheel 15 of the shaft or spindle 13 meshes with a toothed idler 30, which in turn meshes with a gear-wheel 31 mounted upon a shaft 32 which is rotatably mounted in bearing-portions in the standards or supports 3 and 4, and extends longitudinally beneath the bed 2 of the machine. Upon its opposite end, the said shaft 32 has mounted thereon the previously mentioned gear-wheel 24 which is in mesh with the idler 25. The various gears 15 and 23, the idlers 30 and 25, and the gears 31 and 24, respectively, are of the same diameters, so that the rotative movements of the shafts or spindles 13 and 21, will be in the same directions and at the same speeds, thus constantly insuring a perfect registration of the female member or element 29 with the master or male member 18, when the shaft or spindle 21 is moved in its forward direction, for the holding or clamping of the corner-piece 19 between two said members 18 and 29, as indicated in Figs. 3 and 4 of the drawings. The said shaft or spindle 21 has suitably secured thereon, at a suitable point between the two standards or posts 10 and 11, a sleeve or collar 33 formed with annular ribs 34 and an annular depression 35, and encircling the said shaft or spindle 21, between the support 10 and said sleeve or collar 33 is a coiled spring 36. Extending from the under surface of the bed-plate 2 are a pair of brackets, and pivoted upon a pin 37 which extends across the lower portion of said brackets is a bell-crank. This bell-crank comprises a forwardly extending arm or member 38, and an upwardly projecting arm or member 39 which extends through a suitable opening in the bed-plate 2 and is provided at its upper free end with a yoke or bifurcated end-member, as 40. The said yoke is provided with inwardly projecting pins or members 41, said pins extending on opposite sides into the annular groove or depression 35 so as to be in operative engagement with the sleeve or collar 33. Connected with a perforation or hole 42, with which the forward end-portion of the arm or member 38 of the bell-crank is provided, is a link or rod 43. This link or rod extends in a downward direction through a hole or opening in the table or work-bench 8, for a short distance below the table, and has attached to its lower portion one end of a coiled spring 44, said spring being of greater stiffness than the spring 36, for the purposes to be presently more fully described. Suitably connected with the lower end of said spring 44 is the upper end-portion of another link or rod 45, the lower end-portion of which is suitably attached by means of a pivot 46 to any ordinary and well-known foot-treadle 47.

From an inspection more particularly of Figs. 1 and 4 of the drawings, it will be seen, that when the operator depresses the foot-treadle 47, the spring 44 being stiffer than the spring 36, its coils will not become distended, until at such time as will be hereinafter more fully specified, but the bell-crank will be brought from the position represented in Figs. 1 and 2 to the position shown in Figs. 3 and 4 of the drawings, thereby compressing the coils of the spring 36 and sliding the shaft or spindle 21 in its forward direction, while revolving, until the female clamping member or element 29 moves directly over and and upon the master or male supporting member 14 so as to positively clamp the cornerpiece, previously arranged in position, between the said two members 14 and 29, as will be clearly understood from an inspection of the several figures of the drawings.

Suitably arranged upon the bed-plate 2 of the machines, and secured in place preferably by means of suitable bolts 48 and nuts 49, or any other suitable fastening means, is a head, the same comprising a plate 50 which is provided with an upwardly extending wall or web-like element 51, having a laterally extending bearing-portion or member 53 and an upper and longitudinally extending overhanging portion, as 52, which is formed with a longitudinally extending groove 54, said groove providing a guide in which is slidably arranged a horizontally disposed rod or bar 55. This rod or bar is retained in its operative position in said guide by means of a plate 56 which is fastened to the face of said overhanging portion 52 by means of screws 57, or other suitable fastening means, said plate 56 being made with a laterally extending slot or elongated opening, as 58, said slot or opening being disposed directly over a part of the said groove or guide 54, substantially as shown and for the purposes to be presently more fully described. As shown, the said rod or bar 55 has suitably attached by means of a screw 59, or fastened in any other suitable manner, to its end-portion nearest the master or male member 14, a creasing means, preferably in the form of a disk or plate, as 60, which is rotatably secured upon one side of the said rod or bar 55 by means of said screw 59, so as to be adjustable as the creasing surface or edge becomes worn, or for the purpose of removing the creasing disk or plate to replace it with another disk or plate. At its opposite end-portion, the said bar or rod 55 is provided upon its opposite sides with suitable screws or pins 61, to each of which is attached an end of a coiled spring 62, said springs 62 of which there are usually two having their opposite ends attached to suitable screws or pins 63 extending from and above the upper surface of the overhanging portion 52, substantially as illustrated. The said bar or rod 55 is also provided with a series of screw-threaded holes 64 into any one of which is removably screwed a laterally projecting pin or arm 65, said arm extending into and through and being slidably arranged in the slot or elongated opening 58 of the plate 56, substantially as shown. Suitably secured to the side of the wall or web-like element 51 is a gas-conveying tube 66 have mounted upon its end, and terminating near the creasing-disk or plate, a burner, as 67, at which the gas can be burned and the heat therefrom conveyed to the creasing-disk or plate, so that the latter will properly crease the leather corner-piece in substantially the manner to be presently more fully described.

Pivotally connected with the bearing-member or portion 53 is a bell-crank comprising a pair of arms, as 68 and 69, the arm 68 having attached thereto the end of a coiled spring 70, and the other end of said spring being fastened to a hook 71, or other suitable fastening means upon the plate 56. The tension of this spring 70 is greater than the combined tension of the springs 62, so that under normal initial conditions the said spring 70 will cause the said bell-crank to assume the position represented in Fig. 5 of the drawings, causing the upper end-portion of the arm 69 to bear firmly against the previously mentioned pin 65 of the reciprocatory rod or bar 55. The result will be that normally when the machine is at rest, the said rod or bar 55 and the creasing-disk or plate will be in the positions indicated in Figs. 2, 4 and 6, with the creasing-edge of the creasing disk or plate removed from its contacting engagement with the master or male-supporting member 18, as will be clearly evident. The arm 68 of the said bell-crank is also made with a suitable hole or opening, as 71', in which is arranged, so as to be operatively connected with the said bell-crank, a suitably formed holding end-portion 73 of a link or rod, 72, said link or rod extending downwardly through a hole or opening in the work-bench, and being connected at its lower end with the previously mentioned link or rod 45 of the foot-treadle 47. The means of connecting the two links is clearly shown in Fig. 1 of the drawings, and consists, essentially, of bar or plate 74 which is firmly secured to the lower end-portion of the link or rod 72 by means of a set-screw 75, or other suitable fastening means, and is also made with a hole 76, as indicated in dotted outline in Figs. 1 and 4 of the drawings, into and through which the previously mentioned rod or link 45 extends, and operates in the manner to be presently set forth.

Having thus in a general manner described one arrangement and combination of devices and parts embodying the principles of my novel creasing apparatus, I will now briefly set forth the operations of the parts of the machine.

Having set the shafts or spindles 13 and 21 in motion, either by means of the pulley 16, or the handle 17, and the shaft beneath the bed-plate and the gear-mechanisms at the respective ends of the bed-plate, a leather corner-piece having had its rough marginal edges previously trimmed or cut away by means of an apparatus of the character set forth in my previous application, Serial Number 456,877, is placed either upon the master or male member, or may be arranged in the hollow part of the female member. The operator thereupon depresses the foot-treadle whereby the shaft or spindle 21 is moved forwardly and the corner-piece is securely clamped or held between the two revolving members 18 and 29, as clearly indicated in Figs. 3 and 4 of the drawings. The operator continuing to still further depress the foot-treadle, the parts having been brought into the positions indicated in said Figs. 3 and 4, and the further sliding movement of the shaft or spindle 21 and the pivotal motion of the main bell-crank, comprising the arms 38 and 39, having ceased, the lower end-portion of the spring 44 by means of the link or rod 45 now acts upon the bar or plate 74, while the coils of the spring 44 are being distended. This action causes the link or rod 72 to move in a downward direction, thereby permitting the bell-crank which is composed of the arms 68 and 69, to move from its normal initial position represented in Fig. 6 to the position indicated in Fig. 7 of the drawings. Simultaneously therewith, the springs 62 will cause the bar or rod 55 and its pin 65 to follow up the receding movement of the arm 69, so as to bring the marginal edge of the creasing wheel or disk 60 directly in active creasing engagement with the marginal edge-portion of the leather cornerpiece which is sufficiently exposed between the two clamping members 18 and 29, substantially as shown. The foot of the operator is kept upon the foot-treadle long enough until one complete revolution of the clamped corner piece has been made, whereby the bell-crank is maintained in the position indicated in Figs. 7 and 8 of the drawings, thus allowing the creasing edge of the disk or plate 60 to follow the irregular or triangular edge-portions of the revolving cornerpiece, the rod or bar moving back and forth with the springs 62 constantly causing the creasing edge of the disk or plate 60 to be in engagement with the edge-portions of the revolving cornerpiece, as will be clearly evident. As soon as the edge-portions of the cornerpieces have been creased, the operator removes the pressure from the foot-treadle, whereupon the several springs return the several parts to their normal initial positions; and the machine is once more ready for the next creasing operation.

I am fully aware that changes may be made in the arrangements and combinations of the various devices and parts, as well as in the details of the construction of the said parts, without departing from the scope of my present invention as defined in the appended claims. Hence, I do not limit my present invention to the exact arrangements and combinations of the devices and parts as set forth in the accompanying specification, nor do I confine myself to the exact details of the construction of the said parts as illustrated in the accompanying drawings.

I claim:—

1. In an apparatus for creasing the edges of corner-pieces, the combination with a bed-plate provided with bearings, of a pair of spindles mounted in said bearings, a male supporting member upon one of said spindles, a female clamping member upon the other spindle, all arranged so that the female member can be made to register with the male member, means for revolving said spindles, and a resiliently mounted and horizontally movable creasing means adapted to be brought in engagement with the edge-portions of the corner-piece exposed between the said clamping members.

2. In an apparatus for creasing the edges of corner-pieces, the combination with a bed-plate provided with bearings, of a pair of spindles mounted in said bearings, a male supporting member upon one of said spindles, a female clamping member upon the other spindle, means for sliding said last-mentioned spindle forwardly so that said female member can be made to register with said male member, and means for revolving said spindles, and a resiliently mounted and horizontally movable creasing means adapted to be brought in engagement with the edge-portions of the corner-piece exposed between the said clamping members.

3. In an apparatus for creasing the edges of corner-pieces, the combination with a bed-plate provided with bearings, of a pair of spindles mounted in said bearings, a male supporting member upon one of said spindles, a female clamping member upon the other spindle, means for sliding said last-mentioned spindle forwardly so that said female member can be made to register with said male member, and means for causing said two spindles to revolve in the same directions and with uniform speeds, and a resiliently mounted and horizontally movable creasing means adapted to be brought in engagement with the edge-portions of the corner-piece exposed between the said clamping members.

4. In an apparatus for creasing the edges of corner-pieces, the combination with a bed-plate provided with bearings, of a pair of spindles mounted in said bearings, a male supporting member upon one of said spindles, a female clamping member upon the other spindle, a coiled spring and a grooved collar mounted upon said last-mentioned spindle, a bell-crank having one end-portion in operative engagement with said grooved collar, a link connected with the other end of said bell-crank, a foot-treadle for actuating said link and the bell-crank for sliding said spindle which is provided with said female member forwardly so that said female member can be made to register with said male member, and means for causing the two spindles to revolve in the same directions and with uniform speeds, and a resiliently mounted and horizontally movable creasing means adapted to be brought in engagement with the edge-portions of the corner-piece exposed between the said clamping members.

5. In an apparatus for creasing the edges of corner-pieces, the combination with a bed-plate provided with bearings, of a pair of spindles mounted in said bearings, a male supporting member upon one of said spindles, a female clamping member upon the other spindle, means for sliding said last-mentioned spindle forwardly so that said female member can be made to register with said male member, and means for causing said two spindles to revolve in the same directions and with uniform speeds, consisting of a shaft mounted in bearings beneath the bed-plate, a gear-wheel upon each end-portion of said shaft, said gear-wheels being of the same size, a gear-wheel upon said male-member carrying spindle, and a gear-wheel upon said female member-carrying spindle, said gears being of the same sizes, and a toothed idler meshing with each pair of said gears, and a resiliently mounted and horizontally movable creasing means adapted to be brought in engagement with the edge-portions of the corner-piece exposed between the said clamping members.

6. In an apparatus for creasing the edges of corner-pieces, the combination with a bed-plate provided with bearings, of a pair of spindles mounted in said bearings, a male supporting member upon one of said spindles, a female clamping member upon the other spindle, a coiled spring and a grooved collar mounted upon said last-mentioned spindle, a bell-crank having one end-portion in operative engagement with said grooved collar, a link connected with the other end of said bell-crank, a foot-treadle for actuating said link and the bell-crank for sliding said spindle which is provided with said female member forwardly so that said female member can be made to register with said male member, and means for causing the two spindles to revolve in the same direction and with uniform speeds, consisting of a shaft mounted in bearings beneath the bed-plate, a gear-wheel upon each end-portion of said shaft, said gear-wheels being of the same size, a gear-wheel upon said male member carrying spindle, and a gear-wheel upon said female member-carrying spindle, said gears being of the same size, and a toothed idler meshing with each pair of said gears, and a resiliently mounted and horizontally movable creasing means adapted to be brought in engagement with the edge-portions of the corner-piece, exposed between the said clamping members.

7. In an apparatus for creasing the edges of corner-pieces, the combination with a bed-plate provided with bearings, of a pair of spindles mounted in said bearings, a male supporting member upon one of said spindles, a female clamping member upon the other spindle, means for sliding said last-mentioned spindle forwardly so that said female member can be made to register with said male member, and means for revolving said spindles, and a head provided with a guide, a spring-controlled creasing means slidably arranged in said guide and adapted to be brought in engagement with the edge-portions of the cornerpiece exposed between the said clamping members.

8. In an apparatus for creasing the edges of corner-pieces, the combination with a bed-plate provided with bearings, of a pair of spindles mounted in said bearings, a male supporting member upon one of said spindles, a female clamping member upon the other spindle, means for sliding said last-mentioned spindle forwardly so that said female member can be made to register with said male member, and means for causing said two spindles to revolve in the same directions and with uniform speeds, and a head provided with a guide, a spring-controlled creasing means slidably arranged in said guide and adapted to be brought in engagement with the edge-portions of the corner-piece exposed between the said clamping members.

9. In an apparatus for creasing the edges of corner-pieces, the combination with a bed-plate provided with bearings, of a pair of spindles mounted in said bearings, a male supporting member upon one of said spindles, a female clamping member upon the other spindle, a coiled spring and a grooved collar mounted upon said last-mentioned spindle, a bell-crank having one end-portion in operative engagement with said grooved collar, a link connected with the other end of said bell-crank, a foot-treadle for actuating said link and the bell-crank for sliding said spindle which is provided with said female member forwardly so that said female member can be made to register with said male member, and means for causing the two spindles to revolve in the same directions and with uniform speeds, and a head provided with a guide, a spring-controlled creasing means slidably arranged in said guide and adapted to be brought in engagement with the edge-portions of the cornerpiece exposed between the said clamping members.

10. In an apparatus for creasing the edges of corner-pieces, the combination with a bed-plate provided with bearings, of a pair of spindles mounted in said bearings, a male supporting member upon one of said spindles, a female clamping member upon the other spindle, means for sliding said last-mentioned spindle forwardly so that said female member can be made to register with said male member, and means for causing said two spindles to revolve in the same directions and with uniform speeds, consisting of a shaft mounted in bearings beneath the bed-plate, a gear-wheel upon each end-portion of said shaft, said gear-wheels being of the same size, a gear-wheel upon said male-member carrying spindle, and a gear-wheel upon said female member-carrying spindle, said gears being of the same sizes, and a toothed idler meshing with each pair of said gears, and a head provided with a guide, a spring-controlled creasing means slidably arranged in said guide and adapted to be brought in engagement with the edge-portions of the cornerpiece exposed between the said clamping members.

11. In an apparatus for creasing the edges of corner-pieces, the combination with a bed-plate provided with bearings, of a pair of spindles mounted in said bearings, a male supporting member upon one of said spindles, a female clamping member upon the other spindle, a coiled spring and a grooved collar mounted upon said last-mentioned spindle, a bell-crank having one end-portion in operative engagement with said grooved collar, a link connected with the other end of said bell-crank, a foot-treadle for actuating said link and the bell-crank for sliding said spindle which is provided with said female member forwardly so that said female member can be made to register with said male member, and means for causing the two spindles to revolve in the same direction and with uniform speeds, consisting of a shaft mounted in bearings beneath the bed-plate, a gear-wheel upon each end-portion of said shaft, said gear-wheels being of the same size, a gear-wheel upon said male member-carrying spindle, and a gear-wheel upon said female member-carrying spindle, said gears being of the same size, and a toothed idler meshing with each pair of said gears, and a head provided with a guide, a spring-controlled creasing means slidably arranged in said guide and adapted to be brought in engagement with the edge-portions of the cornerpiece exposed between the said clamping members.

12. In an apparatus for creasing the edges of corner-pieces, the combination with a bed-plate provided with bearings, of a pair of spindles mounted in said bearings, a male supporting member upon one of said spindles, a female clamping member upon the other spindle, all arranged so that the female member can be made to register with the male member, means for revolving said spindles, combined with an upright formed with a guide, a spring-controlled rod slidably arranged in said guide, a resilient and horizontally movable creasing means connected with said rod, and means for producing reciprocatory movements of said rod for bringing said creasing means in engagement with the edge-portions of the cornerpiece exposed between said clamping members.

13. In an apparatus for creasing the edges of corner-pieces, the combination with a bed-plate provided with bearings, of a pair of spindles mounted in said bearings, a male supporting member upon one of said spindles, a female clamping member upon the other spindle, means for sliding said last-mentioned spindle forwardly so that said female member can be made to register with said male member, and means for revolving said spindles, combined with an upright formed with a guide, a spring-controlled rod slidably arranged in said guide, a resilient and horizontally movable creasing means connected with said rod, and means for producing reciprocatory movements of said rod for bringing said creasing means in engagement with the edge-portions of the cornerpiece exposed between said clamping members.

14. In an apparatus for creasing the edges of corner-pieces, the combination with a bed-plate provided with bearings, of a pair of spindles mounted in said bearings, a male supporting member upon one of said spindles, a female clamping member upon the other spindle, means for sliding said last-mentioned spindle forwardly so that said female member can be made to register with said male member, and means for causing said two spindles to revolve in the same directions and with uniform speeds, combined with an upright formed with a guide, a spring-controlled rod slidably arranged in said guide, a resilient and horizontally movable creasing means connected with said rod, and means for producing reciprocatory movements of said rod for bringing said creasing means in engagement with the edge-portions of the corner piece exposed between said clamping members.

15. In an apparatus for creasing the edges of corner-pieces, the combination with a bed-plate provided with bearings, of a pair of spindles mounted in said bearings, a male supporting member upon one of said spindles, a female clamping member upon the other spindle, a coiled spring and a grooved collar mounted upon said last-mentioned spindle, a bell-crank having one end-portion in operative engagement with said grooved collar, a link connected with the other end of said bell-crank, a foot-treadle for actuating said link and the bell-crank for sliding said spindle which is provided with said female member forwardly so that said female member can be made to register with said male member, and means for causing the two spindles to revolve in the same directions and with uniform speeds, combined with an upright formed with a guide, a spring-controlled rod slidably arranged in said guide, a resilient and horizontally movable creasing means connected with said rod, and means for producing reciprocatory movements of said rod for bringing said creasing means in engagement with the edge-portions of the cornerpiece exposed between said clamping members.

16. In an apparatus for creasing the edges of corner-pieces, the combination with a bed-plate provided with bearings, of a pair of spindles mounted in said bearings, a male supporting member upon one of said spindles, a female clamping member upon the other spindle, means for sliding said last-mentioned spindle forwardly so that said female member can be made to register with said male member, and means for causing said two spindles to revolve in the same directions and with uniform speeds, consisting of a shaft mounted in bearings beneath the bed-plate, a gear-wheel upon each end-portion of said shaft, said gear-wheels being of the same size, a gear-wheel upon said male-member carrying spindle, and a gear-wheel upon said female member-carrying spindle, said gears being of the same sizes, and a toothed idler meshing with each pair of said gears, combined with an upright formed with a guide, a spring-controlled rod slidably arranged in said guide, a resilient and horizontally movable creasing means connected with said rod, and means for producing reciprocatory movements of said rod for bringing said creasing means in engagement with the edge-portions of the cornerpiece exposed between said clamping members.

17. In an apparatus for creasing the edges of corner-pieces, the combination with a bed-plate provided with bearings, of a pair of spindles mounted in said bearings, a male supporting member upon one of said spindles, a female clamping member upon the other spindle, a coiled spring and a grooved collar mounted upon said last-mentioned spindle, a bell-crank having one end-portion in operative engagement with said grooved collar, a link connected with the other end of said bell-crank, a foot-treadle for actuating said link and the bell-crank for sliding said spindle which is provided with said female member forwardly so that said female member can be made to register with said male member, and means for causing the two spindles to revolve in the same direction and with uniform speeds, consisting of a shaft mounted in bearings beneath the bed-plate, a gear-wheel upon each end-portion of said shaft, said gear-wheels being of the same size, a gear wheel upon said male member carrying spindle, and a gear-wheel upon said female member-carrying spindle, said gears being of the same size, and a toothed idler meshing with each pair of said gears, combined with an upright formed with a guide, a spring-controlled rod slidably arranged in said guide, a resilient and horizontally movable creasing means connected with said rod, and means for producing reciprocatory movements of said rod for bringing said creasing means in engagement with the edge-portions of the cornerpiece exposed between said clamping members.

18. In an apparatus for creasing the edges of corner-pieces, the combination with a bed-plate provided with bearings, of a pair of spindles mounted in said bearings, a male supporting member upon one of said spindles, a female clamping member upon the other spindle, all arranged so that the female member can be made to register with the male member, means for revolving said spindles, combined with an upright formed with a guide, a spring-controlled rod slidably arranged in said guide, a resilient and horizontally movable creasing means connected with said rod, a pin extending laterally from said rod, a spring-controlled bell-crank pivotally mounted upon said upright, and means for actuating said bell-crank, for producing reciprocatory movements of said rod for bringing said creasing means in engagement with the edge-portions of the cornerpiece exposed between said clamping members.

19. In an apparatus for creasing the edges of corner-pieces, the combination with a bed-plate provided with bearings, of a pair of spindles mounted in said bearings, a male supporting member upon one of said spindles, a female clamping member upon the other spindle, means for sliding said last-mentioned spindle forwardly so that said female member can be made to register with said male member, and means for revolving said spindles, combined with an upright formed with a guide, a spring-controlled rod slidably arranged in said guide, a resilient and horizontally movable creasing means connected with said rod, a pin extending laterally from said rod, a spring-controlled bell-crank pivotally mounted upon said upright, and means for actuating said bell-crank, for producing reciprocatory movements of said rod for bringing said creasing means in engagement with the edge-portions of the cornerpiece exposed between said clamping members.

20. In an apparatus for creasing the edges of corner-pieces, the combination with a bed-plate provided with bearings, of a pair of spindles mounted in said bearings, a male supporting member upon one of said spindles, a female clamping member upon the other spindle, means for sliding said last-mentioned spindle forwardly so that said female member can be made to register with said male member, and means for causing said two spindles to revolve in the same directions and with uniform speeds, combined with an upright formed with a guide, a spring-controlled rod slidably arranged in said guide, a resilient and horizontally movable creasing means connected with said rod, a pin extending laterally from said rod, a spring-controlled bell-crank pivotally mounted upon said upright, and means for actuating said bell-crank, for producing reciprocatory movements of said rod for bringing said creasing means in engagement with the edge-portions of the cornerpiece exposed between said clamping members.

21. In an apparatus for creasing the edges of corner-pieces, the combination with a bed-plate provided with bearings, of a pair of spindles mounted in said bearings, a male supporting member upon one of said spindles, a female clamping member upon the other spindle, a coiled spring and a grooved collar mounted upon said last-mentioned spindle, a bell-crank having one end-portion in operative engagement with said grooved collar, a link connected with the other end of said bell-crank, a foot-treadle for actuating said link and the bell-crank for sliding said spindle which is provided with said female member forwardly so that said female member can be made to register with said male member, and means for causing the two spindles to revolve in the same directions and with uniform speeds, combined with an upright formed with a guide, a spring-controlled rod slidably arranged in said guide, a resilient and horizontally movable creasing means connected with said rod, a pin extending laterally from said rod, a spring-controlled bell-crank pivotally mounted upon said upright, and means for actuating said bell-crank, for producing reciprocatory movements of said rod for bringing said creasing means in engagement with the edge-portions of the cornerpiece exposed between said clamping members.

22. In an apparatus for creasing the edges of corner-pieces, the combination with a bed-plate provided with bearings, of a pair of spindles mounted in said bearings, a male supporting member upon one of said spindles, a female clamping member upon the other spindle, means for sliding said last-mentioned spindle forwardly so that said female member can be made to register with said male member, and means for causing said two spindles to revolve in the same directions and with uniform speeds, consisting of a shaft mounted in bearings beneath the bed-plate, a gear-wheel upon each end-portion of said shaft, said gear-wheels being of the same size, a gear-wheel upon said male-member-carrying spindle, and a gear-wheel upon said female member-carrying spindle, said gears being of the same sizes, and a toothed idler meshing with each pair of said gears, combined with an upright formed with a guide, a spring-controlled rod slidably arranged in said guide, a resilient and horizontally movable creasing means connected with said rod, a pin extending laterally from said rod, a spring-controlled bell-crank pivotally mounted upon said upright, and means for actuating said bell-crank, for producing reciprocatory movements of said rod for bringing said creasing means in engagement with the edge-portions of the cornerpiece exposed between said clamping members.

23. In an apparatus for creasing the edges of corner-pieces, the combination with a bed-plate provided with bearings, of a pair of spindles mounted in said bearings, a male supporting member upon one of said spindles, a female clamping member upon the other spindle, a coiled spring and a grooved collar mounted upon said last-mentioned spindle, a bell-crank having one end-portion in operative engagement with said grooved collar, a link connected with the other end of said bell-crank, a foot-treadle for actuating said link and the bell-crank for sliding said spindle which is provided with said female member forwardly so that said female member can be made to register with said male member, and means for causing the two spindles to revolve in the same direction and with uniform speeds, consisting of a shaft mounted in bearings beneath the bed-plate, a gear-wheel upon each end-portion of said shaft, said gear-wheels being of the same size, a gear-wheel upon said male member carrying spindle, and a gear-wheel upon said female member-carrying spindle, said gears being of the same size, and a toothed idler meshing with each pair of said gears, combined with an upright formed with a guide, a spring-controlled rod slidably arranged in said guide, a resilient and horizontally movable creasing means connected with said rod, a pin extending laterally from said rod, a spring-controlled bell-crank pivotally mounted upon said upright, and means for actuating said bell-crank, for producing reciprocatory movements of said rod for bringing said creasing means in engagement with the edge-portions of the cornerpiece exposed between said clamping members.

24. In an apparatus for creasing the edges of cornerpieces, the combination with a bed-plate provided with bearings, of a pair of spindles mounted in said bearings, a male supporting member upon one of said spindles, a female clamping member upon the other spindle, an upright mounted upon said bed-plate, said upright being formed with a guide, a spring-controlled rod slidably arranged in said guide, a resilient and horizontally movable creasing means connected with the rod, a pin extending laterally from said rod, a spring-controlled bell-crank pivotally mounted upon said upright, said bell-crank having one of its arms normally in engagement with said laterally extending pin, means for revolving said two spindles, a grooved collar and a coiled spring mounted upon said female member-carrying spindle, a bell-crank having one end-portion in operative engagement with said grooved collar, a link connected with the other end of said last-mentioned bell-crank, a spring attached to said link, said spring being of greater stiffness than the spring upon said female member-carrying spindle, a second link connected with said first-mentioned spring, a foot-treadle for actuating said links and said last-mentioned bell-crank for sliding said female member-carrying spindle in a forward direction so as to cause it to register with said male supporting member, and a rod-connection between said first-mentioned bell-crank and the link which is attached to the foot-treadle, for producing reciprocatory movements of the creasing-means carrying rod for bringing said creasing means in engagement with the edge-portions of the cornerpiece exposed between said clamping means.

25. In an apparatus for creasing the edges of cornerpieces, the combination with revoluble cornerpiece clamping members, of a resilient and horizontally movable creasing means adapted to be brought in engagement with the edge-portions of the cornerpiece exposed between said clamping members.

26. In an apparatus for creasing the edges of cornerpieces, the combination with revoluble cornerpice clamping members, of an upright formed with a guide, a rod slidably arranged in said guide, a resilient and horizontally movable creasing means upon said rod, a spring attached at one end to said rod and at its other end to said upright, all arranged for bringing said creasing means in engagement with the edge-portions of the cornerpiece exposed between the clamping means, and means for moving said rod and its creasing means in an opposite direction.

27. In an apparatus for creasing the edges of cornerpieces, the combination with revoluble corner-piece clamping members, of an upright formed with a guide, a rod slidably arranged in said guide, a creasing means upon said rod, a spring attached at one end to said rod and at its other end to said upright, all arranged for bringing said creasing means in engagement with the edge-portions of the cornerpiece exposed between the clamping means, a pin extending laterally from said rod, a bell-crank pivotally connected with said upright, a spring between said bell-crank and said upright for normally forcing one of the arms of said bell-crank against said pin, and means connected with said bell-crank for actuating the same.

28. In an apparatus for creasing the edges of cornerpieces, the combination with revoluble cornerpiece clamping members, of a resilient and horizontally movable creasing means adapted to be brought in engagement with the edge-portions of the cornerpiece exposed between said clamping members, and a burner closely located to said creasing means for heating the same.

29. In an apparatus for creasing the edges of cornerpieces, the combination with revoluble cornerpiece clamping members, of an upright formed with a guide, a rod slidably arranged in said guide, a resilient and horizontally movable creasing means upon said rod, a spring attached at one end to said rod and at its other end to said upright, all arranged for bringing said creasing means in engagement with the edge-portions of the cornerpiece exposed between the clamping means, and means for moving said rod and its creasing means in an opposite direction, and a burner closely located to said creasing means for heating the same.

30. In an apparatus for creasing the edges of cornerpieces, the combination with revoluble corner-piece clamping members, of an upright formed with a guide, a rod slidably arranged in said guide, a resilient and horizontally movable creasing means upon said rod, a spring attached at one end to said rod and at its other end to said upright, all arranged for bringing said creasing means in engagement with the edge-portions of the cornerpiece exposed between the clamping means, a pin extending laterally from said rod, a bell-crank pivotally connected with said upright, a spring between said bell-crank and said upright for normally forcing one of the arms of said bell-crank against said pin, and means connected with said bell-crank for actuating the same, and a burner closely located to said creasing means for heating the same.

In testimony, that I claim the invention set forth above I have hereunto set my hand this 16th day of December, 1908.

CORNELIUS J. LYSAGHT.

Witnesses:
FREDK. H. W. FRAENTZEL,
FRED I. C. FRAENTZEL.